(12) United States Patent
Jackson et al.

(10) Patent No.: US 7,399,351 B2
(45) Date of Patent: Jul. 15, 2008

(54) PIGMENTED INKJET INK AND INK SET

(75) Inventors: Christian Jackson, Wilmington, DE (US); Richard Douglas Bauer, Kennett Square, PA (US)

(73) Assignee: EI du Pont de Nemours and Company, Wilmington, DE (US)

( * ) Notice: Subject to any disclaimer, the term of this patent is extended or adjusted under 35 U.S.C. 154(b) by 262 days.

(21) Appl. No.: 11/148,905

(22) Filed: Jun. 9, 2005

(65) Prior Publication Data

US 2005/0284329 A1 Dec. 29, 2005

Related U.S. Application Data

(60) Provisional application No. 60/583,235, filed on Jun. 25, 2004.

(51) Int. Cl.
C09D 11/02 (2006.01)
(52) U.S. Cl. .................................... 106/31.6
(58) Field of Classification Search ................ 106/31.6
See application file for complete search history.

(56) References Cited

U.S. PATENT DOCUMENTS

| 5,085,698 | A | 2/1992 | Ma et al. |
| 5,231,131 | A | 7/1993 | Chu et al. |
| 5,833,743 | A | 11/1998 | Elwakil |
| 6,235,098 | B1 * | 5/2001 | Maekawa et al. ........ 106/31.61 |
| 6,426,014 | B1 | 7/2002 | Silverbrook |
| 6,443,555 | B1 | 9/2002 | Silverbrook et al. |
| 6,509,916 | B1 | 1/2003 | Kakinuma et al. |
| 6,742,869 | B2 | 6/2004 | Redding et al. |
| 6,852,156 | B2 | 2/2005 | Yeh et al. |
| 2002/0033863 | A1 | 3/2002 | Silverbrook |
| 2002/0071001 | A1 * | 6/2002 | Sekiya ..................... 347/47 |
| 2002/0097308 | A1 * | 7/2002 | Oyanagi ................... 347/100 |
| 2004/0100643 | A1 | 5/2004 | Jones et al. |
| 2005/0075449 | A1 * | 4/2005 | Kubota ..................... 524/588 |
| 2005/0284330 | A1 * | 12/2005 | Jackson ................... 106/31.6 |
| 2006/0082629 | A1 * | 4/2006 | Kato et al. ................ 347/100 |

FOREIGN PATENT DOCUMENTS

| EP | 0 556 649 B1 | 8/1993 |
| EP | 1 247 845 A1 | 10/2002 |

OTHER PUBLICATIONS

International Search Report.

* cited by examiner

*Primary Examiner*—Jerry A. Lorengo
*Assistant Examiner*—Veronica Faison Gee
(74) *Attorney, Agent, or Firm*—Steven C. Benjamin

(57) ABSTRACT

The present invention pertains to a pigment based inkjet ink and ink set. More particularly the invention pertains to an ink that is red, green or blue in color comprised of certain pigment combinations. The invention further pertains to an ink set comprised of at least one red, green or blue ink and most preferably to an ink set with at least six differently colored inks that includes a cyan, magenta, yellow, red, blue and green ink.

25 Claims, No Drawings

PIGMENTED INKJET INK AND INK SET

CROSS-REFERENCE TO RELATED APPLICATION

This application claims priority under 35 U.S.C. §119 from U.S. Provisional Application Ser. No. 60/583,235 (filed Jun. 25, 2004), the disclosure of which is incorporated by reference herein for all purposes as if fully set forth.

BACKGROUND OF THE INVENTION

The present invention pertains to a pigment based inkjet ink and ink set. More particularly the invention pertains to an ink that is red, green or blue in color comprised of certain pigment combinations. The invention further pertains to an ink set comprised of at least one red, green or blue ink, and most preferably to an ink set with at least six differently colored inks that includes a cyan, magenta, yellow, red, blue and green ink.

Inkjet printing is a non-impact printing process in which droplets of ink are deposited on a substrate, such as paper, to form the desired image. The droplets are ejected from a printhead in response to electrical signals generated by a microprocessor. Inkjet printers offer low cost, high quality printing and have become a popular alternative to other types of printers.

Color characteristics of pigment-containing inks play an important role in the quality of the printed ink-jet image. Perceived color quality can be characterized using any one of several color-space systems such as CIELAB (CIE No. 15.2, *Colorimetry*, 2nd. Ed., Commission Internationale de l'Eclarage, Vienna, Austria, 1986) or Munsell (*Munsell Book of Color*, Munsell Color Co., Baltimore, Md., 1929), as is well known in the art. With respect to Munsell color space, a given color is defined using three terms, namely Hue, Value and Chroma. With respect to CIELAB color space, a color is defined using three terms L*, a* and b*. In this system L* defines the lightness of the color and it ranges from 0 (black) to 100 (white). The terms a* and b* together define the hue, where a* ranges from a negative number (green) to a positive number (red) and b* ranges from a negative number (blue) to a positive number (yellow). Additional terms such as hue angle (h°) and chroma (C*) can also be used to describe a given color instead of a* and b* wherein $$h^o = \tan^{-1}\left(\frac{b^*}{a^*}\right) \quad \text{Equation 1}$$

$$C^* = \sqrt{a^{*2} + b^{*2}} \quad \text{Equation 2}$$

To achieve full color images, ink jet printers typically employ a cyan ("C"), magenta ("M") and yellow ("Y") ink. These colors are known as subtractively-mixing primaries, as light is subtracted as it passes through the colorant. When these colors are mixed in pairs they form red, green and blue (so-called "secondaries"), and when all are mixed together they form black. Thus these three color inks can be used to print the entire range of hues with good chromaticity and/or color saturation.

The range of colors that a given ink set can print is called the color gamut, and can be described in the CIELAB system by the volume in the L*a*b* color space that encompasses a palette of representative colors that can be printed by the ink set on a given substrate. While a CMY ink set can produce all possible color hues, the color gamut does not encompass all the colors that can be perceived by the human eye. Thus there is still a desire to improve the printed image quality and extend the range of colors that can be printed.

One method for improving image quality or color gamut is to expand the ink set used for printing to include additional inks. There are various ways to employ expanded ink sets.

One way is by including inks of the same hue but lower concentration (so-called "lights"). Light colors improve image quality by producing smoother tonal gradations and light colors in an image. For light colors, the "light" or "photo" inks, which typically have 10%-20% of the colorant content of the full-strength colors, are used. For intermediate strength colors, "light" and full-strength inks are mixed. For the darkest colors only full-strength ink drops are used. Thus a smooth gradation of color tones can be obtained.

A further advantage of using "lights" is that it allows the dye concentration of the full-strength inks to be increased further without having the problem of dark sparsely spaced dots on the image. The higher concentration inks produce higher chroma secondary colors when mixed on high quality photo papers, and they also produce a darker CMY process black. These two effects serve to enhance the color gamut significantly.

U.S. Pat. No. 5,833,743 discloses how up to three different concentrations of each of the primary hues can be used to greatly increase the color gamut obtainable from a CMY ink set. Typically "light" inks are only used for cyan and magenta as yellow is light enough so that any graininess is not objectionable.

U.S. Pat. No. 6,509,916 discloses a printing method where a light ink of a different hue is added to the three-color set in order to improve improved gradation reproduction and expand the color gamut.

Another way an expanded ink set can be employed is by including more inks with hues other than CMY. In some cases this additional ink may be what is known as a spot color, where the image to be printed contains an abundance of a certain color and so that color is specifically added to the ink set. This spot color is not necessarily outside the existing color gamut of the CMY ink set. In the case where the desired color is inside the gamut, adding the ink still provides the advantage of using less ink since a single ink is used rather than a mixture, and it also may provide improved light color tones, again by avoiding using a mixture of other colors. As another example the digital image to be printed may contain a certain color that is difficult to accurately print with the existing ink set and that color can be selected as an additional ink for the ink set.

All of the above-identified publications are incorporated by reference herein for all purposes as if fully set forth.

The art described above attempts to improve image quality by making piecemeal additions to the basic CMY ink set to address specific issues; however, none of the solutions in themselves provides both a range of colors able to reproduce photographs and computer monitor images as well as reproduce light color tones. In addition many of the solutions assume that it is a simple matter to add colors to the ink set. This may be the case in many conventional (non-inkjet) printing processes; however, in inkjet printing the number of ink slots available is both fixed by the printer design and also limited due to the scanning nature of much ink-jet printing, which limits the width and weight of the printhead.

Commonly owned U.S. application Ser. No. 11/105,258 (filed Apr. 13, 2005), claiming priority from U.S. Provisional Appln. No. 60/564,062 (filed Apr. 21, 2004), entitled "Inkjet Ink Set for Improved Color Reproduction" (the disclosures of which are incorporated by reference for all purposes as if fully set forth), describes a six color dye-based ink set.

There is, consequently, a need for an ink set that integrates (a) a systematic method of expanding the color gamut, with (b) a method of printing light tones, highlights and grayscales using (c) a limited number of ink channels. There is furthermore a need to achieve these image quality improvements with pigment-based ink to gain the inherently better color fastness of pigment colorants. It is an object of this invention to provide an inkjet ink and ink set that address these issues.

SUMMARY OF THE INVENTION

In accordance with one aspect of the present invention, there is provided a colored inkjet ink, comprising a pigment colorant and vehicle, preferably an aqueous vehicle, and having a color selected from the group consisting of red, green and blue, wherein:

(a) if the colored inkjet ink is red, the pigment colorant comprises a mixture of at least one magenta pigment and at least one yellow pigment, preferably in a weight ratio (M:Y) of about 2:1 to about 1:2;

(b) if the colored inkjet ink is green, the pigment colorant comprises a mixture of at least one cyan pigment and at least one yellow pigment, preferably in a weight ratio (C:Y) of about 2:1 to about 1:2, and (c) if the colored inkjet ink is blue, the pigment colorant comprises a mixture of at least one magenta pigment and at least one cyan pigment, preferably in a weight ratio (M:C) of about 2:1 to about 1:2.

The red, green and blue inks derived from mixed-CYM pigments were found to provide desirable coloristic properties relative to the single colorant red, green or blue pigment available.

In accordance with another aspect of the present invention, there is provided an inkjet ink set comprising a plurality of colored inkjet inks, wherein at least one of the colored inkjet inks comprises a pigment colorant and vehicle, preferably an aqueous vehicle, and having a color selected from the group consisting of red, green and blue, wherein:

(a) if the colored inkjet ink is red, the pigment colorant comprises a mixture of at least one magenta pigment and at least one yellow pigment, preferably in a weight ratio (M:Y) of about 2:1 to about 1:2;

(b) if the colored inkjet ink is green, the pigment colorant comprises a mixture of at least one cyan pigment and at least one yellow pigment, preferably in a weight ratio (C:Y) of about 2:1 to about 1:2, and (c) if the colored inkjet ink is blue, the pigment colorant comprises a mixture of at least one magenta pigment and at least one cyan pigment, preferably in a weight ratio (M:C) of about 2:1 to about 1:2.

Preferably the ink set comprises at least four different colored inks, more preferably cyan, magenta, yellow and at least one of red, blue or green, and still more preferably CYMRGB, all of which are preferably pigment-based. The ink set further preferably comprises a black pigmented inkjet ink.

By using the same CYM pigments to form the secondary ink colors as are used in the primary ink colors, the number of different pigments and dispersions needed is minimized.

In accordance with another aspect of the present invention, there is provided an inkjet ink set comprising:

(a) a first pigmented inkjet ink that is cyan in color, has a hue angle between about 180 to about 250, and comprises a first vehicle and a cyan pigment;

(b) a second pigmented inkjet ink that is yellow in color, has a hue angle between about 70 to about 120, and comprises a second vehicle and a yellow pigment;

(c) a third pigmented inkjet ink that is magenta in color, has a hue angle between about 320 to about 10, and comprises a third vehicle and a magenta pigment;

(d) a fourth pigmented inkjet ink that is blue in color, has a hue angle between about 250 to about 320, and comprises a fourth vehicle and a blue pigment colorant;

(e) a fifth pigmented inkjet ink that is red in color, has a hue angle between about 10 to about 70, and comprises a fifth vehicle and a red pigment colorant; and (f) a sixth pigmented inkjet ink that is green in color, has a hue angle between about 120 to about 180, and comprises a sixth vehicle and a green pigment colorant.

The reference to "a" specific color pigment generally refers to one or more pigments of that color. For example, "a magenta pigment" refers to one or more magenta pigments. The reference to "a" specific color pigment colorant generally refers to one or more pigments of that color, or combinations of differently colored pigments to achieve that color. For example, "a blue pigment colorant" refers to one or more blue pigments, or combinations of various pigments (such as magenta and cyan) that result in a blue color.

In one embodiment of the at least CYMRGB ink set, the pigment content in each of the first second and third inks is individually from about 1.5% to about 4% by weight, and the pigment content in each of the fourth, fifth and sixth inks is individually from about 4% to about 9% by weight, based on the total weight of the respective ink.

In another embodiment of the at least CYMRGB ink set, the pigment content in each of the first second, third, fourth, fifth and sixth inks is individually from about 1.5% to about 4% by weight, based on the total weight of the respective ink.

Preferably the ink set has various combinations of the characteristics described above. Also preferably the inkjet inks sets further comprise a black pigmented inkjet ink.

One advantage of the CYMRGB ink set is expanded color gamut. Another advantage is improved image quality (less grainy light tones) because the concentration of the CYM inks is kept low (by removing the need to make secondary colors with CYM). Another advantage is more desirable secondary colors due to the presence of the RGB inks and, in addition, the secondary colors are achieved with lower ink load. Yet another advantage is a more attractive composite black achieved by using RGB.

In accordance with yet another aspect of the present invention, there is provided an inkjet printer responsive to digital data signals, which has been equipped with an inkjet ink or inkjet ink set as described above. Preferably the printer is further equipped with a page-wide printhead array.

In yet another aspect of the present invention, there is provided a method for ink jet printing onto a substrate, comprising the steps of:

(a) providing an ink jet printer that is responsive to digital data signals;

(b) loading the printer with a substrate to be printed;

(c) loading the printer with an inkjet ink or inkjet ink set as set forth above and described in further detail below; and (d) printing onto the substrate using the ink or inkjet ink set in response to the digital data signals.

Preferred substrates include plain paper, photo paper and textiles.

These and other features and advantages of the present invention will be more readily understood by those of ordinary skill in the art from a reading of the following detailed description. It is to be appreciated that certain features of the invention which are, for clarity, described above and below in the context of separate embodiments, may also be provided in combination in a single embodiment. Conversely, various features of the invention that are, for brevity, described in the context of a single embodiment, may also be provided separately or in any subcombination. In addition, references in the singular may also include the plural (for example, "a" and "an" may refer to one, or one or more) unless the context specifically states otherwise. Further, reference to values stated in ranges include each and every value within that range.

DETAILED DESCRIPTION OF THE PREFERRED EMBODIMENTS

Colored Inks

Colored inks comprise a vehicle, preferably an aqueous vehicle, and a colorant. The colorant can be soluble (dye) or dispersed (pigment) in the ink vehicle. The red, green and blue inks in accordance with the present invention, or used in accordance with the present invention, comprise at least one pigment, and preferably comprise a combination of pigments. The inks may further comprise dye, but the colorant is still predominately pigment. In addition to the pigmented inks, the ink sets in accordance with the invention may comprise one or more dye-based inks in addition to the required pigment-based inkjet inks.

Colorants are referred to herein by their "C.I." designation established by Society Dyers and Colourists, Bradford, Yorkshire, UK and published in the *The Color Index*, Third Edition, 1971. That designation uses a perceived color as part of the name, but there is no formal spectral definition of what constitutes orange, red, violet, blue, green, etc. For the purposes of this invention, ink color will be named according to hue angle ranges as follows.

| Color | Hue Angle Range |
| --- | --- |
| Red | 10-70 |
| Yellow | 70-120 |
| Green | 120-180 |
| Cyan | 180-250 |
| Blue | 250-320 |
| Magenta | 320-10 |

In choosing colorants for an inkjet ink set, the hue angle for a given color preferably falls within the following ranges.

| Color | Hue Angle Range |
| --- | --- |
| Red | 15-65 |
| Yellow | 75-110 |
| Green | 135-165 |
| Cyan | 195-230 |
| Blue | 265-305 |
| Magenta | 325-360 |

The hue angle is preferably determined by printing an ink onto high quality inkjet media, such as photo paper, and measuring the color with a spectrometer, as generally understood by those of ordinary skill in the art, and as explained in further detail below.

Useful pigments include: (cyan) Pigment Blue 15:3 and Pigment Blue 15:4; (magenta) Pigment Red 122 and Pigment Red 202; (yellow) Pigment Yellow 14, Pigment Yellow 74, Pigment Yellow 95, Pigment Yellow 110, Pigment Yellow 114, Pigment Yellow 128 and Pigment Yellow 155; (red) Pigment Orange 5, Pigment Orange 34, Pigment Orange 43, Pigment Orange 62, Pigment Red 17, Pigment Red 49:2, Pigment Red 112, Pigment Red 149, Pigment Red 177, Pigment Red 178, Pigment Red 188, Pigment Red 255 and Pigment Red 264; (green) Pigment Green 1, Pigment Green 2, Pigment Green 7 and Pigment Green 36; (blue) Pigment Blue 60, Pigment Violet 3, Pigment Violet 19, Pigment Violet 23, Pigment Violet 32, Pigment Violet 36 and Pigment Violet 38; and (black) carbon black.

Preferred pigments include (cyan) PB 15:3 and PB 15:4; (magenta) PR 122 and PR 202; (yellow) PY 74, PY 95, PY 110, PY 128 and PY 155; (red) PR 149, PR 177, PR 178, PR 264 and PO 34; (green) PG 36; and (blue) PB 60 and PV 23.

Inks may also be formed from a mixture of pigments. The "pigment content" in a given ink refers the total pigment present in that ink, whether a single pigment species or a combination of two or more pigment species.

Pigments, traditionally, are stabilized to dispersion in a vehicle by dispersing agents, such as polymeric dispersants or surfactants. More recently though, so-called "self-dispersible" or "self-dispersing" pigments (hereafter "SDP(s)") have been developed. As the name would imply, SDPs are dispersible in water, or aqueous vehicle, without dispersants. Thus, pigment may be stabilized to dispersion by surface treatment to be self-dispersing (see, for example, U.S. Pat. No. 6,852,156, the disclosure of which is incorporated by reference herein for all purposes as if fully set forth), by treatment with dispersant in the traditional way, or by some combination of surface treatment and dispersant.

Preferably, when dispersant is employed, the dispersant(s) is a random or structured polymeric dispersant. Preferred random polymers include acrylic polymer and styrene-acrylic polymers. Most preferred are structured dispersants which include AB, BAB and ABC block copolymers, branched polymers and graft polymers. Some useful structured polymers are disclosed in U.S. Pat. No. 5,085,698, EP-A-0556649 and U.S. Pat. No. 5,231,131 (the disclosures of which are incorporated by reference herein for all purposes as if fully set forth).

Useful pigment particle size is typically in the range of from about 0.005 micron to about 15 micron. Preferably, the pigment particle size should range from about 0.005 to about 5 micron, more preferably from about 0.005 to about 1 micron, and most preferably from about 0.005 to about 0.3 micron.

Vehicle

The vehicle can be any suitable vehicle but is preferably an "aqueous vehicle" by which is meant water or a mixture of water and at least one water-soluble organic solvent (co-solvent). Selection of a suitable mixture depends on requirements of the specific application, such as desired surface tension and viscosity, the selected colorant, drying time of the ink, and the type of substrate onto which the ink will be printed. Representative examples of water-soluble organic solvents that may be selected are disclosed in U.S. Pat. No. 5,085,698 (the disclosure of which is incorporated by reference herein for all purposes as if fully set forth).

If a mixture of water and a water-soluble solvent is used, the aqueous vehicle typically will contain about 30% to about 95% water with the balance (i.e., about 70% to about 5%) being the water-soluble solvent. Preferred compositions contain about 60% to about 95% water, based on the total weight of the aqueous vehicle.

Inks based on aqueous vehicles can be made to be fast penetrating (rapid drying) by including surfactants or penetrating agents such as glycol ethers and 1,2-alkanediols. Glycol ethers include ethylene glycol monobutyl ether, diethylene glycol mono-n-propyl ether, ethylene glycol mono-isopropyl ether, diethylene glycol mono-iso-propyl ether, ethylene glycol mono-n-butyl ether, ethylene glycol mono-t-butyl ether, diethylene glycol mono-n-butyl ether, triethylene glycol mono-n-butyl ether, diethylene glycol mono-t-butyl ether, 1-methyl-1-methoxybutanol, propylene glycol mono-t-butyl ether, propylene glycol mono-n-propyl ether, propylene glycol mono-iso-propyl ether, propylene glycol mono-n-butyl ether, dipropylene glycol mono-n-butyl ether, dipropylene glycol mono-n-propyl ether, and dipropylene glycol mono-isopropyl ether. 1,2-Alkanediols are preferably 1,2-C4-6 alkanediols, most preferably 1,2-hexanediol. Suitable surfactants include ethoxy-lated acetylene diols (e.g. Surfynols® series from Air Products), ethoxylated primary (e.g. Neodol® series from Shell) and secondary (e.g. Tergitol® series from Union Carbide) alcohols, sulfosuccinates (e.g. Aerosol® series from Cytec), organosilicones (e.g. Silwet® series from Witco) and fluoro surfactants (e.g. Zonyl® series from DuPont).

The amount of glycol ether(s) and 1,2-alkanediol(s) added must be properly determined, but is typically in the range of from about 1 to about 15% by weight and more typically about 2 to about 10% by weight, based on the total weight of the ink. Surfactants may be used, typically in the amount of about 0.01 to about 5% and preferably about 0.2 to about 2%, based on the total weight of the ink.

"Nonaqueous vehicle" refers a vehicle that is substantially comprised of a nonaqueous solvent or mixtures of such solvents, which solvents can be polar and/or nonpolar. Examples of polar solvents include alcohols, esters, ketones and ethers, particularly mono- and di-alkyl ethers of glycols and polyglycols such as monomethyl ethers of mono-, di- and tri-propylene glycols and the mono-n-butyl ethers of ethylene, diethylene and triethylene glycols. Examples of nonpolar solvents include aliphatic and aromatic hydrocarbons having at least six carton atoms and mixtures thereof including refinery distillation products and by-products. The solvents may also be comprised in part, or entirely, or polymerizable solvents such as solvents which cure upon application of UV light (UV curable).

Even when no water is deliberately added to the nonaqueous vehicle, some adventitious water may be carried into the formulation, but generally this will be no more than about 2-4%. By definition, the nonaqueous ink of this invention will have no more than about 10%, and preferably no more than about 5%, by weight of water based on the total weight of the nonaqueous vehicle.

Other Ingredients

Other ingredients may be formulated into the inkjet ink, to the extent that such other ingredients do not interfere with the stability and jetablity of the ink, which may be readily determined by routine experimentation. Such other ingredients are in a general sense well known in the art.

Polymers may be added to the ink to improve durability. The polymers can be soluble in the vehicle or dispersed (e.g. "emulsion polymer" or "latex"), and can be ionic or nonionic. Useful classes of polymers include acrylics, styrene-acrylics and polyurethanes.

Biocides may be used to inhibit growth of microorganisms.

Inclusion of sequestering (or chelating) agents such as ethylenediaminetetraacetic acid (EDTA), iminodiacetic acid (IDA), ethylenediamine-di(o-hydroxyphenylacetic acid) (EDDHA), nitrilotriacetic acid (NTA), dihydroxyethylglycine (DHEG), trans-1,2-cyclohex-anediaminetetraacetic acid (CyDTA), dethylenetriamine-N,N,N',N", N"-pentaacetic acid (DTPA), and glycoletherdiamine-N,N,N',N'-tetraacetic acid (GEDTA), and salts thereof, may be advantageous, for example, to eliminate deleterious effects of heavy metal impurities.

Proportions of Ingredients

The components described above can be combined to make an ink in various proportions and combinations in order to achieve desired ink properties, as generally described above, and as generally recognized by those of ordinary skill in the art. Some experimentation may be necessary to optimize inks for a particular end use, but such optimization is generally within the ordinary skill in the art.

For example, the amount of vehicle in an ink, whether aqueous or non-aqueous, is typically in the range of about 70% to about 99.8%, and preferably about 80% to about 99.8%, by weight based on total weight of the ink.

In a colored ink, colorant will generally be present in amounts up to about 12%, and more typically in the range of about 1% to about 9%, by weight based on total weight of the ink. Dispersants, when needed for stabilization of an insoluble colorant, are employed at levels based on the amount of colorant and are usually expressed as a weight ratio. Generally, dispersants are employed at a pigment-to-dispersant weight ratio in the range of about 1:3 to about 4:1.

Other ingredients (additives), when present, generally comprise less than about 15% by weight, based on the total weight of the ink. Surfactants, when added, are generally in the range of about 0.2 to about 3% by weight, based on the total weight of the ink. Polymers, other than polymeric fixing agents, can be added as needed, but will generally be less than about 15% by weight, based on the total weight of the ink.

Ink Properties

Drop velocity, separation length of the droplets, drop size and stream stability are greatly affected by the surface tension and the viscosity of the ink. Ink jet inks typically have a surface tension in the range of about 20 dyne/cm to about 70 dyne/cm at 25° C. Viscosity can be as high as 30 cP at 25° C., but is typically somewhat lower (30 cP or less). The ink has physical properties are adjusted to the ejecting conditions and printhead design. The inks should have excellent storage stability for long periods so as not clog to a significant extent in an ink jet apparatus. Further, the ink should not corrode parts of the ink jet printing device it comes in contact with, and it should be essentially odorless and non-toxic.

Although not restricted to any particular viscosity range or printhead, the application contemplated by this invention will generally require lower viscosity ink. Thus the viscosity (at 25° C.) of the inks can be less than about 7 cps; less than about 5 cps, and less than about 3.5 cps.

Ink Set

The term "ink set" refers to all the fluids an inkjet printer is equipped to jet. These fluids include the at least four colored inks referred to above. Other inks (or fluids) could also be present such as, for example, an additional colorless ink containing a durability or gloss enhancing ingredient which would be applied after all of the colored inks (a "top-coat") to increase abrasion resistance and/or gloss of the printed images. Another type of such fluid is a (preferably colorless) fixer fluid, such as disclosed in commonly owned U.S. application Ser. No. 11/013,128 (filed Dec. 15, 2004), claiming priority from U.S. Provisional Application No. 60/533,068

(filed 29 Dec. 2003), the disclosures of which are incorporated by reference herein for all purposes as if fully set forth.

The ink sets prescribed herein will comprise at least one ink that is a secondary color selected from red, green and blue. Any one or all of these red, green and blue inks can (and preferably) comprise colorant that is a mixture of primary (CYM) pigment colorants. Usually, an ink set will include inks with the primary colors, CYM, and when the colorant in the red, green and blue inks is comprised of a mixture of CYM pigment, it is advantageous to use the same CYM pigment in the mixed secondary as is used in the primary colors.

A six color ink set of primary and secondary colors, CYM-RGB, can comprise:

a cyan ink with colorant a selected from one or any combination of PB 15:3 and/or PB 15:4;

a magenta ink with PR 122;

a yellow ink with colorant a selected from one or any combination of PY 74, 95, 110, 128 and 155;

a red ink with a colorant selected from one or any combination of PO 34, PR 149, PR 177, PR 178 and PR 264;

a green ink with PG 36; and, a blue ink with a colorant selected from one or any combination of PB 60 and PV 23.

Any or all of the RGB inks in the six-color set can comprise colorant that is a mixture of CYM pigments as set forth herein before.

A red ink can comprise mixed M/Y colorant comprising at least one magenta pigment, preferably PR 122, and at least one yellow pigment preferably selected from the group consisting of PY 74, PY 95, PY110, PY 128 and PY 155.

A green ink can comprise mixed C/Y colorant comprising at least one cyan pigment preferably selected from the group consisting of PB15:3 and PB15:4, and at least one yellow pigment preferably selected from the group consisting of PY 74, PY 95, PY 110, PY 128 and PY 155.

The blue ink can comprise mixed M/C colorant comprising at least one magenta pigment, preferably PR 122, and at least one cyan pigment selected from the group consisting of PB 15:3 and PB 15:4.

Any ink set can further comprise a pigment-based black ink, especially a black ink comprising a carbon black pigment.

Each of the inks in the ink set individually comprises a vehicle, preferably an aqueous vehicle, the appropriate colorant and optional additives, in the ingredient proportions and having the properties as described above.

Printer

The present ink sets are advantageous for reducing the volume of ink jetted and, therefore, are particularly well suited for application by inkjet printers that apply all the ink in one pass. Such printers can be, for example, those equipped with a printhead array that is fixed in position (fixed array).

The printer can be, for example, similar to that described in U.S. Pat. No. 6,443,555 (the disclosure of which is incorporated by reference herein for all purposes as if fully set forth). The printhead(s) for such a printer can be, for example, those described in U.S. Pat. No. 6,426,014 and US20020033863 (the disclosures of which are also incorporated by reference herein for all purposes as if fully set forth). Ink jet printers are responsive to digital data signals.

The fixed array printers will generally be capable of printing at least about 600 dpi, preferably at least about 1200 dpi, and more preferably at least about 1600 dpi. Printing is preferably accomplished in one pass and thus the printhead is configured to achieve the stipulated dpi in a single pass of the substrate through the print zone.

The width of the printing zone is at least as wide as the width of the area to be printed so that printing can be performed rapidly in one pass. Accordingly, printheads of this sort are commonly referred to as page-wide arrays or full-width arrays. For so-called "SOHO" (small office, home office) and "network" printing, the width of the printing zone is at least wide as standard papers, such as A4 size paper and/or letter size (8.5×11 inch) paper. For so-called "wide-format" printing, the print zone is preferably at least about 36 inches wide and can accommodate media that is fed from a roll.

Although the ink droplets ejected from a printhead can be of any suitable volume, preferably droplets are less than about 10 pL, and more preferably in the range of about 1 to about 5 pL, even more preferably about 1 to about 2 pL.

Substrates

Substrates suitable for use in the present invention can be any useful substrate known to those of ordinary skill in the relevant art. For example, the substrate can be plain paper such as common electrophotographic copier paper. The substrate can also be specialty media such as microporous papers, polymer coated papers and hybids of the two. The substrate can be polymeric film such as vinyl chloride and polyester. Polymeric films are especially useful in wide-format applications such as signs, billboards and banners. The substrate can be a non-woven textile such as spun bonded polyolefin (e.g. Tyvek®, DuPont Co.). The substrate can also be woven textile such as silk, cotton, nylon and polyester.

EXAMPLES

Structured polymers were employed as dispersants. Dispersant A was a block co-polymer of benzyl methacrylate and methacrylic acid (13//10). Dispersant B was a graft co-polymer of POEA-g-ETEGMA/methacrylic acid (66-g-4/30), where POEA means phenoxyethyl acrylate and ETEGMA means ethoxytriethyleneglycol methacrylate. Exemplary preparative methods are described in U.S. Pat. No. 6,742,869 (the disclosure of which is incorporated by reference herein for all purposes as if fully set forth) under the headings "Dispersant 1" and "Dispersant 2".

Cyan Dispersion 1

PB 15:4 was milled with Dispersant A that had been neutralized with KOH (pigment/dispersant weight ratio of 1.5) in a 2-roll mill. The resulting chip was let down into water to make a concentrated dispersion with 15% by weight pigment.

Cyan Dispersion 2

A self-dispersed cyan pigment dispersion obtained from Cabot Corporation (Cab-o-Jet 250 C) with 9.9% by weight pigment in water.

Magenta Dispersion 1

PR 122 was milled with Dispersant A that had been neutralized with KOH (pigment/dispersant weight ratio of 1.5) in a 2-roll mill. The resulting chip was let down into water to make a concentrated dispersion with 15% by weight pigment.

Magenta Dispersion 2

A self-dispersed magenta pigment dispersion obtained from Cabot Corporation (Cab-o-Jet 260M) with 9.7% by weight pigment in water.

Yellow Dispersion 1

PY 128 was milled with Dispersant A that had been neutralized with KOH (pigment/dispersant weight ratio of 1.22) in a 2-roll mill. The resulting chip was let down into water to make a concentrated dispersion with 15% by weight pigment.

Yellow Dispersion 2

A self-dispersed yellow pigment dispersion obtained from Cabot Corporation (Cabo-Jet 270Y) with 10.2% by weight pigment in water.

Red Dispersion

PR 149 was milled with Dispersant A that had been neutralized with KOH (pigment/dispersant weight ratio of 1.5) in a 2-roll mill. The resulting chip was let down into water to make a concentrated dispersion with 15% by weight pigment.

Green Dispersion

PG 36 was milled with Dispersant B that had been neutralized with KOH (pigment/dispersant weight ratio of 1.5) in a media mill. The resulting slurry was diluted with water to make a concentrated dispersion with 15% by weight pigment.

Blue Dispersion

PB 60 was milled with Dispersant A that had been neutralized with KOH (pigment/dispersant weight ratio of 4.0) in a 2-roll mill. The resulting chip was let down into water to make a concentrated dispersion with 15% by weight pigment.

Preparation of Inks

Inks were prepared according to the following formulations. Ingredients were mixed together and filtered. Water was deionized. Surfynol® 465 is a surfactant from Air Products Corp (Allentown, Pa., USA). Proxel® GXL is a Biocide from Avecia (Wilmington, Del., USA). Proportions are percent weight based on the total weight of the ink, unless otherwise specified.

| Cyan Ink Ingredients | Ink CY1 | Ink CY2 | Ink CY3 |
|---|---|---|---|
| Cyan Disp. 1 (% Pigment) | 2.0 | 3.0 | 4.0 |
| 1,2-hexanediol | 4.0 | 4.0 | 4.0 |
| Glycerol | 10.0 | 10.0 | 10.0 |
| Surfynol ® 465 | 0.2 | 0.2 | 0.2 |
| Ethylene glycol | 5.0 | 5.0 | 5.0 |
| 2-pyrrolidone | 3.0 | 3.0 | 3.0 |
| Water | Bal. to 100 | Bal. to 100 | Bal. to 100 |

| Magenta Ink Ingredients | Ink M1 | Ink M2 | Ink M3 |
|---|---|---|---|
| Magenta Disp. 1 (% Pigment) | 2.0 | 3.0 | 4.0 |
| 1,2-hexanediol | 4.0 | 4.0 | 4.0 |
| Glycerol | 10.0 | 10.0 | 10.0 |
| Surfynol ® 465 | 0.2 | 0.2 | 0.2 |
| Ethylene glycol | 5.0 | 5.0 | 5.0 |
| 2-pyrrolidone | 3.0 | 3.0 | 3.0 |
| Water | Bal. to 100 | Bal. to 100 | Bal. to 100 |

| Yellow Ink Ingredients | Ink Y1 | Ink Y2 | Ink Y3 |
|---|---|---|---|
| Yellow Disp. 1 (% Pigment) | 2.0 | 3.0 | 4.0 |
| 1,2-hexanediol | 4.0 | 4.0 | 4.0 |
| Glycerol | 10.0 | 10.0 | 10.0 |
| Surfynol ® 465 | 0.2 | 0.2 | 0.2 |
| Ethylene glycol | 5.0 | 5.0 | 5.0 |
| 2-pyrrolidone | 3.0 | 3.0 | 3.0 |
| Water | Bal. to 100 | Bal. to 100 | Bal. to 100 |

| Red Ink Ingredients | Ink R1 | Ink R8 | Ink R9 | Ink R10 |
|---|---|---|---|---|
| Red Disp. (% Pigment) | 8.0 | — | — | — |
| Magenta Disp. 1 (% Pigment) | — | 3.0 | 4.0 | 5.0 |
| Yellow Disp. 1 (% Pigment) | — | 5.0 | 4.0 | 3.0 |
| 1,2-hexanediol | 4.0 | 4.0 | 4.0 | 4.0 |
| Glycerol | 10.0 | 10.0 | 10.0 | 10.0 |
| Surfynol ® 465 | 0.2 | 0.2 | 0.2 | 0.2 |
| Ethylene glycol | 5.0 | 5.0 | 5.0 | 5.0 |
| 2-pyrrolidone | 3.0 | 3.0 | 3.0 | 3.0 |
| Water | Bal. to 100 | Bal. to 100 | Bal. to 100 | Bal. to 100 |

Using the Ink R1 recipe additional red inks were made by adjusting the pigment concentration. Ink R2 was made with 2% by weight pigment; Ink R3 with 3% by weight pigment; Ink R4 with 4% by weight pigment; Ink R5 with 5% by weight pigment; Ink R6 with 6% by weight pigment, and Ink R7 with 7% by weight pigment.

| Blue ink ingredients | Ink B1 | Ink B8 | Ink B9 | Ink B10 |
|---|---|---|---|---|
| Blue Disp. (% Pigment) | 8.0 | — | — | — |
| Cyan Disp. 1 (% Pigment) | — | 3.0 | 4.0 | 5.0 |
| Magenta Disp. 1 (% Pigment) | — | 5.0 | 4.0 | 3.0 |
| 1,2-hexanediol | 4.0 | 4.0 | 4.0 | 4.0 |
| Glycerol | 10.0 | 10.0 | 10.0 | 10.0 |
| Surfynol ® 465 | 0.2 | 0.2 | 0.2 | 0.2 |
| Ethylene glycol | 5.0 | 5.0 | 5.0 | 5.0 |
| 2-pyrrolidone | 3.0 | 3.0 | 3.0 | 3.0 |
| Water | Bal. to 100 | Bal. to 100 | Bal. to 100 | Bal. to 100 |

Using the Ink B1 recipe additional blue inks were made by adjusting the pigment concentration. Ink B2 was made with 2% by weight pigment; Ink B3 with 3% by weight pigment; Ink B4 with 4% by weight pigment; Ink B5 with 5% by weight pigment; Ink B6 with 6% by weight pigment, and Ink B7 with 7% by weight pigment.

| Green Ink Ingredients | Ink G1 | Ink G8 | Ink G9 | Ink G10 |
|---|---|---|---|---|
| Green Disp. (% Pigment) | 6.0 | — | — | — |
| Cyan Disp. 1 (% Pigment) | — | 2.0 | 3.0 | 4.0 |
| Yellow Disp. 1 (% Pigment) | — | 4.0 | 3.0 | 2.0 |
| 1,2-hexanediol | 4.0 | 4.0 | 4.0 | 4.0 |
| Glycerol | 10.0 | 10.0 | 10.0 | 10.0 |
| Surfynol ® 465 | 0.2 | 0.2 | 0.2 | 0.2 |
| Ethylene glycol | 5.0 | 5.0 | 5.0 | 5.0 |
| 2-pyrrolidone | 3.0 | 3.0 | 3.0 | 3.0 |
| Water | Bal. to 100 | Bal. to 100 | Bal. to 100 | Bal. to 100 |

Using the Ink G1 recipe additional green inks were made by adjusting the pigment concentration. Ink G2 was made with 2% by weight pigment; Ink G3 with 3% by weight pigment; Ink G4 with 4% by weight pigment; Ink G5 with 5% by weight pigment; Ink G6 with 7% by weight pigment, and Ink G7 with 8% by weight pigment.

| SDP ink ingredients | Ink R11 | Ink G11 | Ink B11 |
|---|---|---|---|
| Cyan Disp. 2 (% Pigment) | — | 2.25 | 2.25 |
| Magenta Disp. 2 (% Pigment) | 3.75 | — | 3.75 |
| Yellow Disp. 2 (% Pigment) | 3.75 | 3.75 | — |
| 1,2-hexanediol | 4.0 | 4.0 | 4.0 |
| Glycerol | 10.0 | 10.0 | 10.0 |
| Surfynol ® 465 | 0.2 | 0.2 | 0.2 |
| Ethylene glycol | 5.0 | 5.0 | 5.0 |
| 2-pyrrolidone | 3.0 | 3.0 | 3.0 |
| Water | Bal. to 100 | Bal. to 100 | Bal. to 100 |

Measurements

Inks were printed using a Canon i550 printer onto Epson Premium Glossy Photo Paper, unless otherwise indicated. Color values were measured using a Greytag-Macbeth Spectrolino spectrometer.

Gamut volume was calculated according to methods described in commonly owned US20040100643, the disclosure of which is incorporated by reference herein for all purposes as if fully set forth. The volume is reported in thousands of L*a*b* units.

Example 1

Printed samples of mixed M/Y pigment red inks R8-R11 are compared to red ink with red pigment, Ink R1, and a composite red made by printing 100% Ink Y3 and 100% Ink M3. In each case, the total pigment per area is the same (8%).

| Ink | Optical Density | L* | Chroma | Hue |
|---|---|---|---|---|
| R1 | 1.21 | 57 | 84 | 34 |
| Printed 100% each - Ink Y3 and Ink M3 | 1.70 | 53 | 83 | 28 |
| R8 | 1.88 | 54 | 78 | 37 |
| R9 | 1.76 | 50 | 79 | 32 |
| R10 | 1.89 | 48 | 80 | 27 |
| R11 | 1.76 | 59 | 94 | 46 |

The mixed M/Y pigment red inks R8-R11 are advantageous in providing a higher optical density and lower L* value at comparable chroma.

Example 2

Printed samples of mixed C/M pigment blue inks B8-B11 are compared to blue ink with blue pigment, Ink B1, and a composite blue made by printing 100% Ink CY3 and 100% Ink M3. In each case, the total pigment per area is the same (8%).

| Ink | Optical Density | L* | Chroma | Hue |
|---|---|---|---|---|
| B1 | 1.37 | 36 | 70 | 286 |
| Printed 100% each - Ink CY3 and Ink M3 | 2.07 | 34 | 76 | 274 |
| B8 | 2.04 | 17 | 75 | 297 |
| B9 | 2.17 | 19 | 74 | 293 |
| B10 | 2.09 | 21 | 69 | 289 |
| B11 | 1.36 | 32 | 77 | 296 |

The mixed C/M pigment blue inks B8-B11 are advantageous in providing a higher optical density and lower L* value at comparable chroma.

Example 3

Printed samples of mixed C/Y pigment green inks G8-G11 are compared to green ink with green pigment, Ink G1, and a composite green made by printing 100% Ink CY3 and 100% Ink Y3. In each case, the total pigment per area is the same (6%).

| Ink | Optical Density | L* | Chroma | Hue |
|---|---|---|---|---|
| G1 | 1.12 | 82 | 73 | 166 |
| Printed 100% each - Ink CY3 and Ink M3 | 1.72 | 56 | 94 | 176 |
| G8 | 1.75 | 53 | 92 | 169 |
| G9 | 2.07 | 47 | 88 | 179 |
| G10 | 2.20 | 45 | 80 | 191 |
| G11 | 1.66 | 56 | 102 | 155 |

The mixed C/Y pigment green inks G8-G11 are advantageous in providing a higher optical density and lower L* value at comparable chroma.

Example 4

The effect of pigment concentration on DOI and gloss is summarized in the following tables.

| Pigment | Blue | | Red | | Green | |
|---|---|---|---|---|---|---|
| Concentration | 60° Gloss | DOI | 60° Gloss | DOI | 60° Gloss | DOI |
| 2% | 89 | 50 | 132 | 40 | 121 | 50 |
| 3% | 85 | 40 | 122 | 30 | 102 | 40 |
| 4% | 79 | 30 | 113 | 30 | 96 | 40 |
| 5% | 75 | 30 | 104 | 20 | 92 | 30 |
| 6% | 73 | 30 | 91 | 10 | 87 | 20 |
| 7% | 67 | 20 | 81 | 10 | 81 | 20 |
| 8% | 62 | 20 | 68 | 0 | 71 | 10 |

| Pigment | Cyan | | Magenta | | Yellow | |
|---|---|---|---|---|---|---|
| Concentration | 60° Gloss | DOI | 60° Gloss | DOI | 60° Gloss | DOI |
| 2% | 94 | 40 | 114 | 40 | 110 | 40 |
| 3% | 91 | 30 | 106 | 20 | 102 | 30 |
| 4% | 82 | 20 | 96 | 10 | 94 | 10 |

The inks used were blue inks B2-B7 and B1; green inks G2-G5, G1 and G6-G7; red inks R2-R8 and R1; cyan inks CY1-CY3; magenta inks M1-M3; and yellow inks Y1-Y3.

A DOI value of 30 or above is advantageous as it indicates a sharp, distinct reflected image. Both high gloss and DOI are important for a high quality image. Both attributes are related to pigment concentration and fall off significantly at pigment loadings higher than about 3-4%.

Example 5

The following table summarizes gamut values for CYMK and CYMKRGB ink sets with various pigment concentrations.

The black ink was included in the ink sets used to provide a better comparison between different ink sets. Without a black ink, the black value for the color gamut was obtained from mixtures of the different colors used. As additional colors were added to the ink set, the black that could have been obtained from mixing colors would thus have changed. To avoid this effect and provide a more balanced comparison, a standard black ink was used in the color gamut volume evaluation. The black ink was based on the CYM formulation and used as pigment (3.5% by weight) of a self-dispersed carbon black.

The highest color gamut was obtained with low (ca 2-4%) concentrations of CMY and high (ca. 4-9%) concentrations of RGB. The high concentrations of RGB produced dark chromatic colors. The lower concentration of C and M allowed attractive lighter tones. This was a good combination for printing on plain paper where gloss and DOI are not a factor.

The best gloss and DOI was obtained at lower pigment loading. Thus, for applications such as photo printing, a CYMRGB ink set where the pigment loading in all inks was less than about 4%, allowed good gloss and DOI without sacrificing gamut (relative to a CYMK set).

| Ink Set | Cyan | Magenta | Yellow | Black | Red | Green | Blue | Gamut Volume |
|---|---|---|---|---|---|---|---|---|
| 1 | 2% | 2% | 3% | 3.5% | — | — | — | 149,000 |
| 2 | 3% | 3% | 3% | 3.5% | — | — | — | 151,000 |
| 3 | 4% | 4% | 4% | 3.5% | — | — | — | 175,000 |
| 4 | 2% | 2% | 3% | 3.5% | 2% | 2% | 2% | 192,000 |
| 5 | 2% | 2% | 3% | 3.5% | 4% | 4% | 4% | 207,000 |
| 6 | 2% | 2% | 3% | 3.5% | 6% | 6% | 6% | 211,000 |
| 7 | 2% | 2% | 3% | 3.5% | 8% | 8% | 8% | 214,000 |
| 8 | 4% | 4% | 4% | 3.5% | 2% | 2% | 2% | 217,000 |
| 9 | 4% | 4% | 4% | 3.5% | 4% | 4% | 4% | 225,000 |
| 10 | 4% | 4% | 4% | 3.5% | 8% | 8% | 8% | 230,000 |
| 11 | 2% | 2% | 4% | 3.5% | 8% | 8% | 4% | 235,000 |

The invention claimed is:

1. A colored inkjet ink, comprising a pigment colorant and vehicle, and having a color selected from the group consisting of red, green and blue, wherein:
   (a) if the colored inkjet ink is red, the pigment colorant comprises a mixture of least one magenta pigment and at least one yellow pigment, wherein the at least one magenta pigment is selected from the group consisting of PR 122 and PR 202 and the at least one yellow pigment is selected from the group consisting of PY 14, PY 74, PY 95, PY 110, PY 114, PY 128 and PY 155;
   (b) if the colored inkjet ink is green, the pigment colorant comprises a mixture of at least one cyan pigment and at least one yellow pigment, wherein the at least one cyan pigment is selected from the group consisting PB 15:3 and PB 15:4 and the at least one yellow pigment is selected from the group consisting of PY 14, PY 74, PY 95, PY 110, PY 114, PY 128 and PY 155, and
   (c) if the colored inkjet ink is blue, the pigment colorant comprises a mixture of at least one magenta pigment and at least one cyan pigment, wherein the at least one magenta pigment is selected from the group consisting of PR 122 and PR 202 and the at least one cyan pigment is selected from the group consisting PB 15:3 and PB 15:4.

2. The inkjet ink of claim 1, wherein the total amount of pigment colorant present in the ink is at least about 1% by weight, based on the total weight of the ink.

3. The inkjet ink of claim 1, wherein the, ink is red, and the weight ratio of M:Y is from about 2:1 to about 1:2.

4. The inkjet ink of claim 1, wherein the ink is red; the at least one magenta pigment is selected from the group consisting of PR 122 and PR 202; and the at least one yellow pigment is selected from the group consisting of PY 14, PY 74, PY 95, PY 110, PY 114, PY 128 and PY 155.

5. The inkjet ink of claim 4, wherein the weight ratio of M:Y is from about 2:1 to about 1:2.

6. The inkjet ink of claim 1, wherein the ink is green, and the weight ratio of C:Y is from about 2:1 to about 1:2.

7. The inkjet ink of claim 1, wherein the ink is green; the at least one cyan pigment is selected from the group consisting of PB 15:3 and PB 15:4; and the at least one yellow pigment is selected from the group consisting of PY 14, PY 74, PY 95, PY 110, PY 114, PY 128 and PY 155.

8. The inkjet ink of claim 7, wherein the weight ratio of C:Y is from about 2:1 to about 1:2.

9. The inkjet ink of claim 1, wherein the ink is blue, and the weight ratio of M:C is from about 2:1 to about 1:2.

10. The inkjet ink of claim 1, wherein the ink is blue; the at least one magenta pigment is selected from the group consisting of PR 122 and PR 202; and the at least one cyan pigment is selected from the group consisting of PB 15:3 and PB 15:4.

11. The inkjet ink of claim 10, wherein the weight ratio of M:C is from about 2:1 to about 1:2.

12. The inkjet ink of claim 1, wherein the vehicle is an aqueous vehicle.

13. An inkjet ink set comprising at least four differently colored inks, at least one of said differently colored inks is a red, green or blue ink comprising a pigment colorant and vehicle, wherein:
   (a) if the colored inkjet ink is red, the pigment colorant comprises a mixture of at least one magenta pigment and at least one yellow pigment, wherein the at least one magenta pigment is selected from the group consisting of PR 122 and PR 202 and the at least one yellow pigment is selected from the group consisting of PY 14, PY 74, PY 95, PY 110, PY 114, PY 128 and PY 155;
   (b) if the colored inkjet ink is green, the pigment colorant comprises a mixture of at least one cyan pigment and at least one yellow pigment, wherein the at least one cyan pigment is selected from the group consisting PB 15:3 and PB 15:4 and the at least one yellow pigment is selected from the group consisting of PY 14, PY 74, PY 95, PY 110, PY 114, PY 128 and PY 155, and
   (c) if the colored inkjet ink is blue, the pigment colorant comprises a mixture of at least one magenta pigment and at least one cyan pigment, wherein the at least one magenta pigment is selected from the group consisting of PR 122 and PR 202 or/and the at least one cyan pigment is selected from the group consisting PB 15:3 and PB 15:4.

14. The inkjet ink set of claim 13, wherein at least one of said differently colored inks is a pigmented magenta ink comprising a magenta pigment, at least one of said differently colored inks is a pigmented yellow ink comprising a yellow pigment, at least one of said differently colored inks is a pigmented cyan ink comprising a cyan pigment.

15. The inkjet ink set of claim 14, wherein the magenta, yellow and cyan pigments in the red, green and/or blue ink are the same, respectively, as in the pigmented magenta ink, pigmented yellow ink and pigmented cyan ink.

16. The inkjet ink set of claim 15, comprising a pigmented magenta ink, a pigmented yellow ink, a pigmented cyan ink, a pigmented red ink, a pigmented green ink and a pigmented blue ink.

17. An inkjet ink set comprising:
(a) a first pigmented inkjet ink that is cyan in color, has a hue angle between about 180 to about 250, and comprises a first vehicle and a cyan pigment;
(b) a second pigmented inkjet ink that is yellow in color, has a hue angle between about 70 to about 120, and comprises a second vehicle and a yellow pigment;
(c) a third pigmented inkjet ink that is magenta in color, has a hue angle between about 320 to about 10, and comprises a third vehicle and a magenta pigment;
(d) a fourth pigmented inkjet ink that is blue in color, has a hue angle between about 250 to about 320, and comprises a fourth vehicle and a mixture of at least one magenta pigment and at least one cyan pigment, wherein the at least one magenta pigment is selected from the group consisting of PR 122 and PR 202 and the at least one cyan pigment is selected from the group consisting PB 15:3 and PB 15:4;
(e) a fifth pigmented inkjet ink that is red in color, has a hue angle between about 10 to about 70, and comprises a fifth vehicle and a red pigment colorant and
(f) a sixth pigmented inkjet ink that is green in color, has a hue angle between about 120 to about 180, and comprises a sixth vehicle and a green pigment colorant.

18. The inkjet ink set of claim 17, wherein the pigment colorant in at least one of the fourth, fifth or sixth pigmented inkjet inks comprises a mixture of at least two pigments selected from the group consisting of the cyan pigment in the first pigmented ink, the magenta pigment in the second pigmented ink, and the yellow pigment in the third pigmented ink.

19. The inkjet ink set of claim 18, wherein the pigment content in each of the first second and third inks is individually from about 1.5% to about 4% by weight, and the pigment content in each of the fourth, fifth and sixth inks is individually from about 4% to about 9% by weight, based on the total weight of the respective ink.

20. The inkjet ink set of claim 18, wherein the pigment content in each of the first second, third, fourth, fifth and sixth inks is individually from about 1.5% to about 4% by weight, based on the total weight of the respective ink.

21. The inkjet ink set of claim 17, wherein:
(a) the cyan pigment in the first pigmented inkjet ink is selected from the group consisting of PB 15:3 and/or PB 15:4, and combinations thereof;
(b) the magenta pigment in the second pigmented inkjet ink is selected from the group consisting of PR 122 and PR 202, and combinations thereof;
(c) the yellow pigment in the third pigmented inkjet ink is selected from the group consisting of PY 14, PY 74, PY 95, PY 110, PY 114, PY 128 and PY 155, and combinations thereof;
(e) the fifth pigmented inkjet ink comprises a red pigment colorant selected from the group consisting of PO 34, PR 149, PR 177, PR 178, PR 264, a yellow-magenta pigment mixture wherein the magenta pigment is selected from the group consisting of PR 122 and PR 202, and the yellow pigment is selected from the group consisting of PY 14, PY 74, PY 95, PY 110, PY 114, PY 128 and PY 155, and combinations thereof;
(f) the sixth pigmented inkjet ink comprises a green pigment colorant selected from the group consisting of PG 36, and a yellow-cyan pigment mixture wherein the cyan pigment is selected from the group consisting of PB 15:3 and PB 15:4, and the yellow pigment is selected from the group consisting of PY 14, PY 74, PY 95, PY 110, PY 114, PY 128 and PY 155, and combinations thereof.

22. The inkjet ink set of claim 17, further comprising a seventh ink which is an aqueous pigment-based black ink.

23. An inkjet printer equipped with an inkjet ink as set forth in claim 1.

24. An inkjet printer equipped with an inkjet ink set as set forth in claim 13.

25. An inkjet printer equipped with an inkjet ink set as set forth in claim 17.

* * * * *